(12) United States Patent
Lewin

(10) Patent No.: US 8,930,354 B2
(45) Date of Patent: Jan. 6, 2015

(54) SYSTEM AND METHOD FOR ORGANIZING CONTENT

(71) Applicant: James Lewin, Austin, TX (US)

(72) Inventor: James Lewin, Austin, TX (US)

(*) Notice: Subject to any disclaimer, the term of this patent is extended or adjusted under 35 U.S.C. 154(b) by 146 days.

(21) Appl. No.: 13/735,024

(22) Filed: Jan. 6, 2013

(65) Prior Publication Data

US 2013/0339388 A1 Dec. 19, 2013

Related U.S. Application Data

(60) Provisional application No. 61/584,772, filed on Jan. 9, 2012.

(51) Int. Cl.
*G06F 17/30* (2006.01)

(52) U.S. Cl.
CPC ...... *G06F 17/30864* (2013.01); *G06F 17/3005* (2013.01)
USPC .......................................... 707/723; 707/770

(58) Field of Classification Search
USPC ................................. 707/723, 770
See application file for complete search history.

(56) References Cited

U.S. PATENT DOCUMENTS

| | | | | |
|---|---|---|---|---|
| 8,544,046 | B2* | 9/2013 | Gran et al. | 725/80 |
| 8,645,279 | B2* | 2/2014 | Schmelzer | 705/67 |
| 8,782,704 | B2* | 7/2014 | Roberts et al. | 725/44 |
| 8,789,108 | B2* | 7/2014 | Gibbs et al. | 725/46 |
| 8,872,344 | B2* | 10/2014 | Mair | 257/773 |
| 8,880,795 | B2* | 11/2014 | Gilson | 711/112 |
| 8,886,947 | B2* | 11/2014 | Farrugia et al. | 713/176 |
| 8,887,095 | B2* | 11/2014 | Krishnamurthy et al. | 715/811 |
| 8,887,184 | B2* | 11/2014 | Klappert et al. | 725/9 |

* cited by examiner

*Primary Examiner* — Kim Nguyen
(74) *Attorney, Agent, or Firm* — Gottlieb, Rackman & Reisman, PC

(57) ABSTRACT

A method for organizing content includes receiving a first query from a first connected device, the first connected device operated on a first platform and associated with a user. The method further includes searching multiple reliable online depositories for first content relevant to the first query, organizing the first content into menus of relevant material, and making the first content available to the first connected device. The method further includes making the first content available to a second connected device, the second connected device operated on a second platform and associated with the user.

20 Claims, 4 Drawing Sheets

1

SYSTEM AND METHOD FOR ORGANIZING CONTENT

CROSS REFERENCE TO RELATED APPLICATIONS

This application claims the benefit under 35 U.S.C. §119 (e) of the priority of U.S. Provisional Application 61/584,772, filed Jan. 9, 2012, entitled "FREQSHO."

TECHNICAL FIELD

The present invention relates generally to music content, and more particularly to a system, method, and software for searching and organizing content.

BACKGROUND

End users who wish to search and organize music content are limited in the ways they can do so. Either they are limited to searching a single online depository at a time, such as iTunes, or they are unable to use the same interface smoothly across multiple devices, such as mobile phones and "smart" televisions.

SUMMARY

According to the present invention, disadvantages and problems associated with previous techniques for searching and organizing content may be reduced or eliminated.

In certain embodiments, a method for organizing content includes receiving a first query from a first connected device, the first connected device operated on a first platform and associated with a user. The method further includes searching multiple reliable online depositories for first content relevant to the first query, organizing the first content into menus of relevant material, and making the first content available to the first connected device. The method further includes making the first content available to a second connected device, the second connected device operated on a second platform and associated with the user.

In certain embodiments, the method may include receiving a second query from the second connected device, searching multiple reliable online depositories for second content relevant to the second query, organizing the second content into menus of relevant material, and making the second content available to the first connected device. The method may further include making the second content available to the second connected device.

In certain embodiments, the method may include performing a multi-artist intuitive search.

Certain embodiments of the present invention may provide one or more technical advantages. For example, users who wish to search and organize online content may step seamlessly from one user device to the next, or from one device platform to the next, while maintaining a uniform experience and without a loss of content.

Certain embodiments of the present invention may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
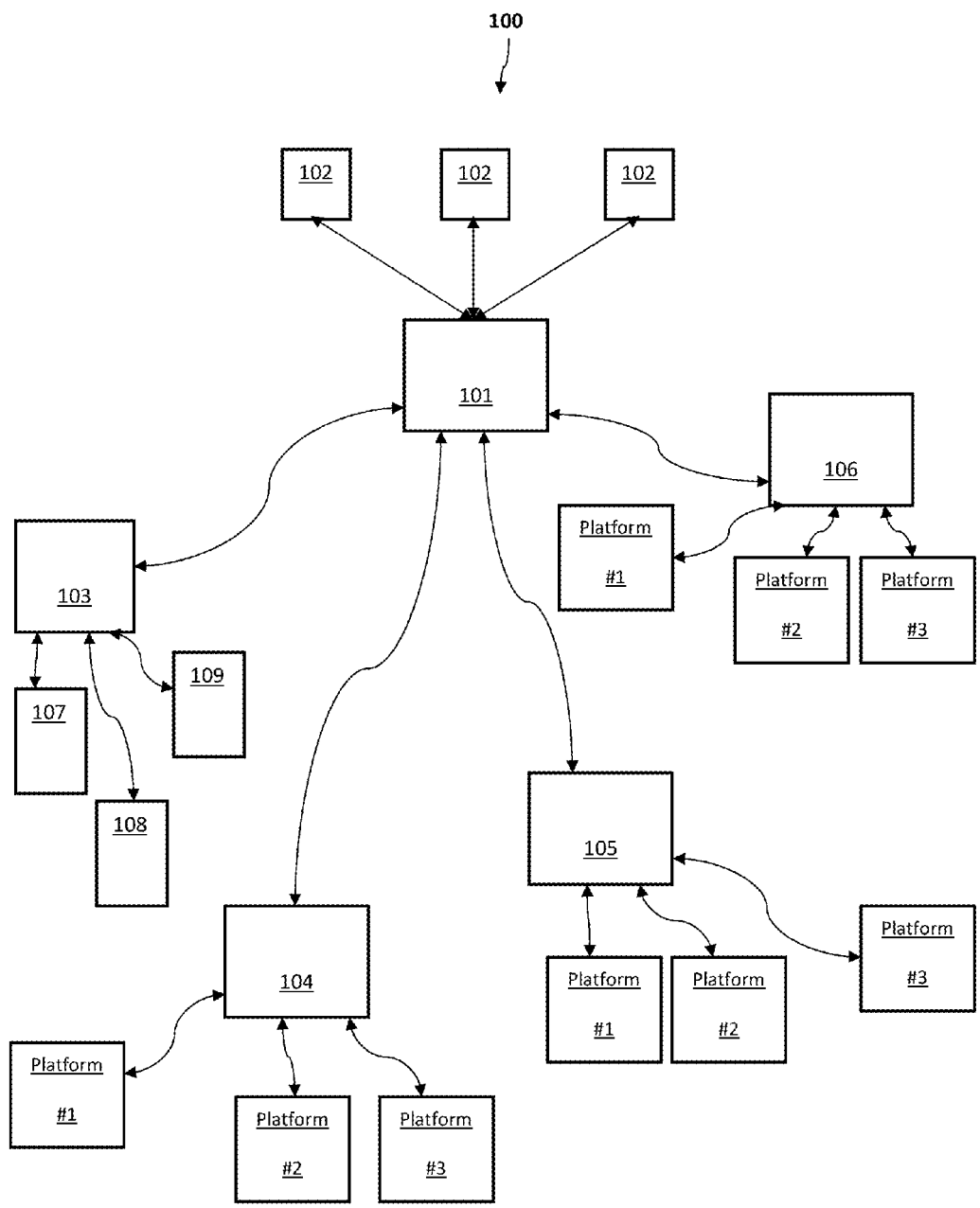
FIG. 1 illustrates system architecture of an embodiment.

FIG. 1 illustrates an example system 100 for searching, organizing, and making content available, according to certain embodiments of the present invention. System 100 may include a server-based software system 101, multiple sources 102, mobile device client application 103, tablet pc client application 104, smart tv client application 105, and other device client application 106.

For the purpose of this application, sources 102 may be reliable online depositories.

Server-based software system 101 includes one or more processing units. The processing units are operable to receive an artist query from a connected device. For the purpose of this application, a connected device may be a user device in wireline or wireless communication with server-based software system 100. The connected device may be a user device operated on a first platform, such as platform 107, and the artist query may be submitted to server-based software system 101 via, for example, mobile device client application 103. As another example, where the connected device is a tablet pc, the artist query may be submitted to server-based software system 101 via tablet pc client application 104.

Figure 2:
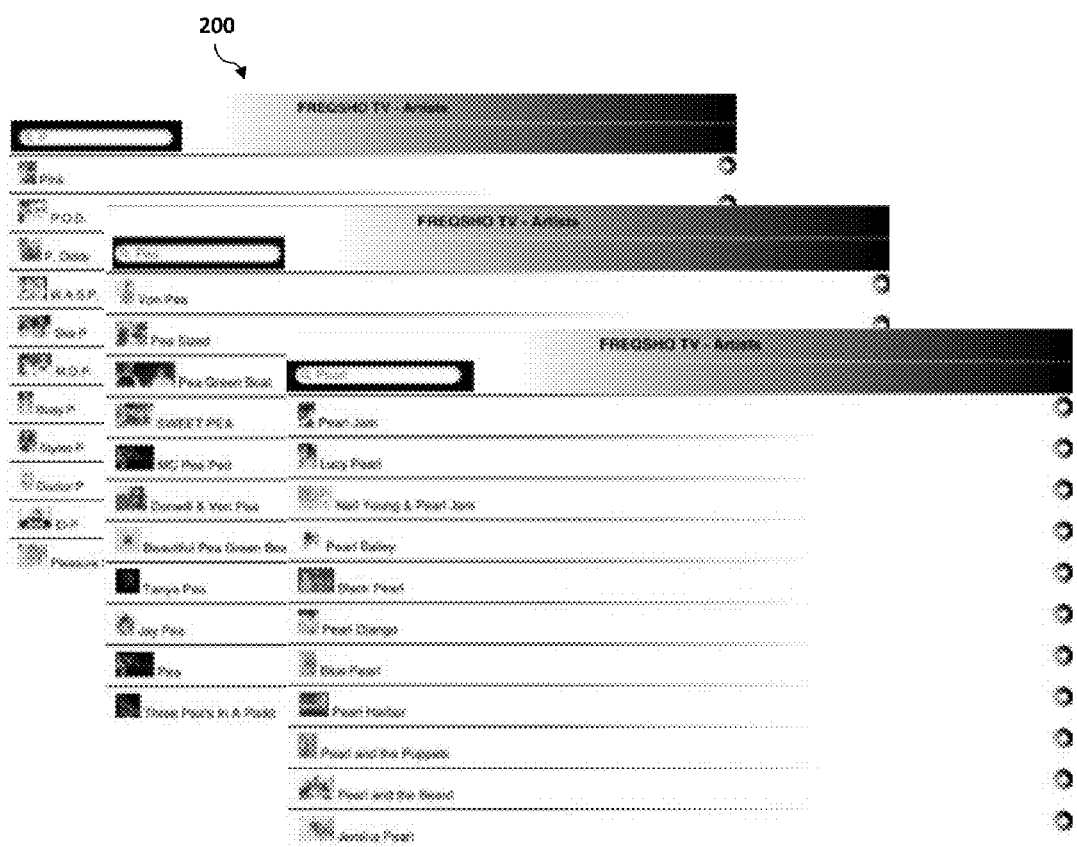
FIG. 2 illustrates a multi-artist search method of an embodiment.

Server-based software system 101 is further operable to search multiple sources 102 or reliable online depositories for content relevant to the artist query. In some embodiments, as shown in FIG. 2, server-based software system 101 may perform an intuitive multi-artist search 200, by progressively filtering search results with each letter entered by the user on a connected device.

Figure 3:
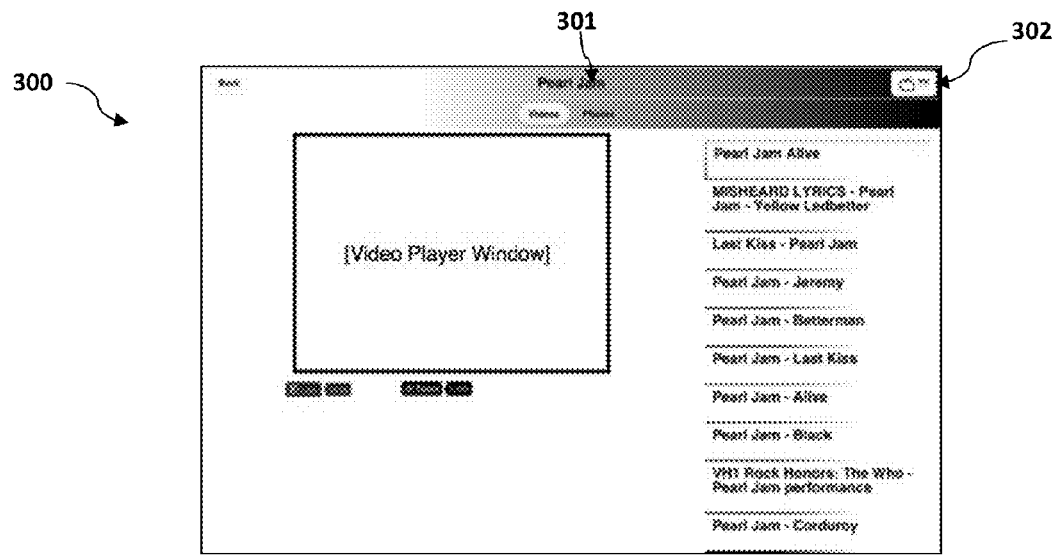
FIG. 3 illustrates a web-video player of an embodiment.

Server-based software system 101 is further operable to organize content into menus of relevant material, as shown in FIG. 3. In FIG. 3, a web video player 300 is shown having a queried artist 30 land an available device indicator 302. Available device indicator 302 displays on connected device which connected device the user may utilize to display the chosen content. In the case of web video player 300, the chosen content is available for display on a tv.

Server-based software system 101 is further operable to make content available to a first connected device, for example a smart tv operating smart tv client application 105, as well as to a second connected device, such as a mobile phone operating mobile device client application 103, with the first connected device operated on a platform that is different from the platform of the second connected device.

In some embodiments, server-based software system 101 may be further operable to distinguish which videos can be reproduced on a first connected device, as well as distinguish which videos can be reproduced on a second connected device, and only make those videos that can be reproduced on each of the connected devices available respectively. That is, when the user accesses content through mobile device client application 103, the available video content may not be identical to the available video content when the same user accesses content through smart tv client application 105.

In some embodiments, server-based software system 101 may be further operable to make artist biographical information available to a connected device in response to a request from connected device. The request may be submitted by a user through, for example, mobile device client application 103.

In some embodiments, server-based software system 101 may be further operable to integrate content available from social media channels into content previously compiled.

Figure 4:
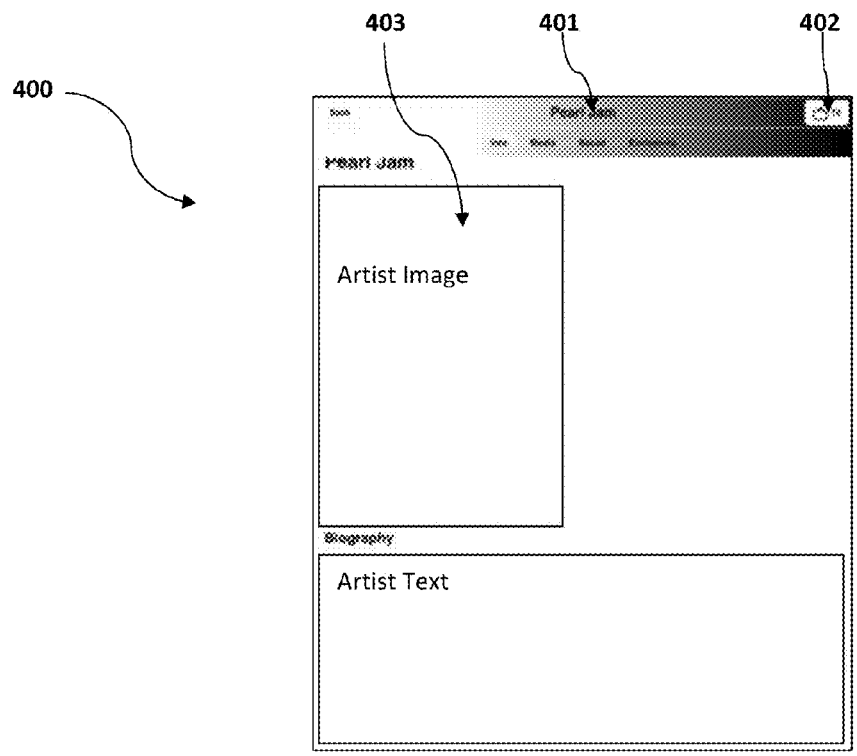
FIG. 4 illustrates an artist info page of an embodiment.

FIG. 4 illustrates an artist info page 400 integrated for display on a user's device. Artist info page 400 is shown with an artist name 401, available device indicator 402, and artist info 403.

Figure 5:
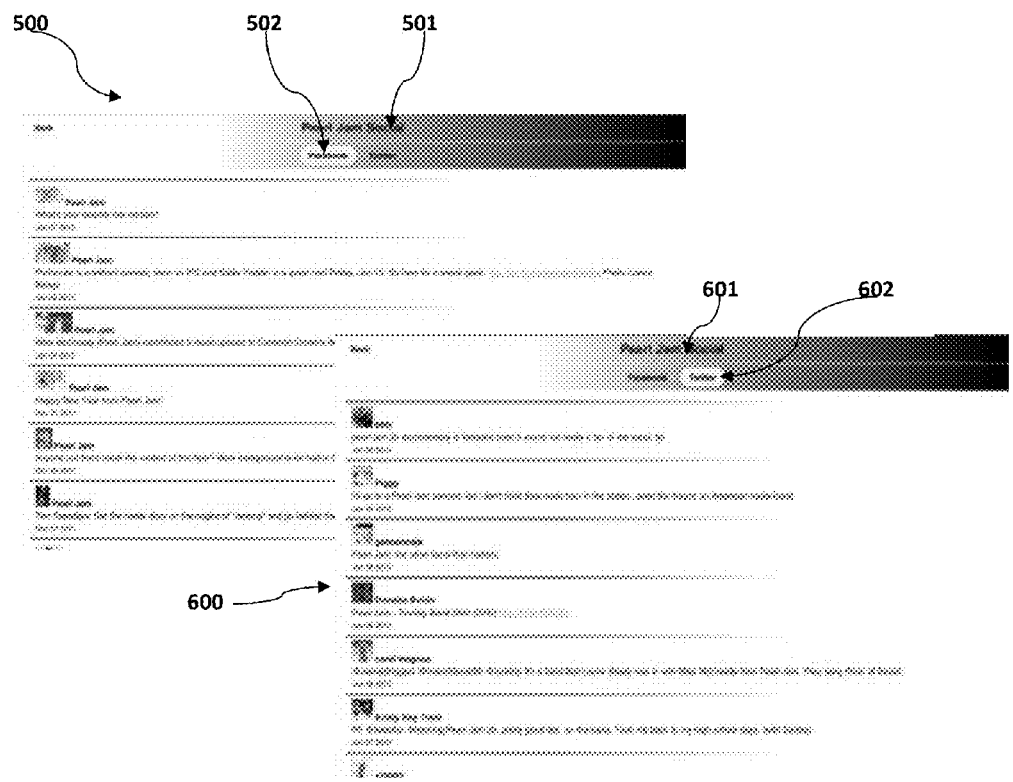
FIG. 5 illustrates an artist social media page of an embodiment.

FIG. 5 illustrates artist social media page 500 and artist social media page 600. Artist social media page 500 includes the artist selected 501 and the feed type 502, here a Facebook feed. Artist social media page 600 includes the artist selected 601 and the feed type 602, here a Twitter feed.

Figure 6:
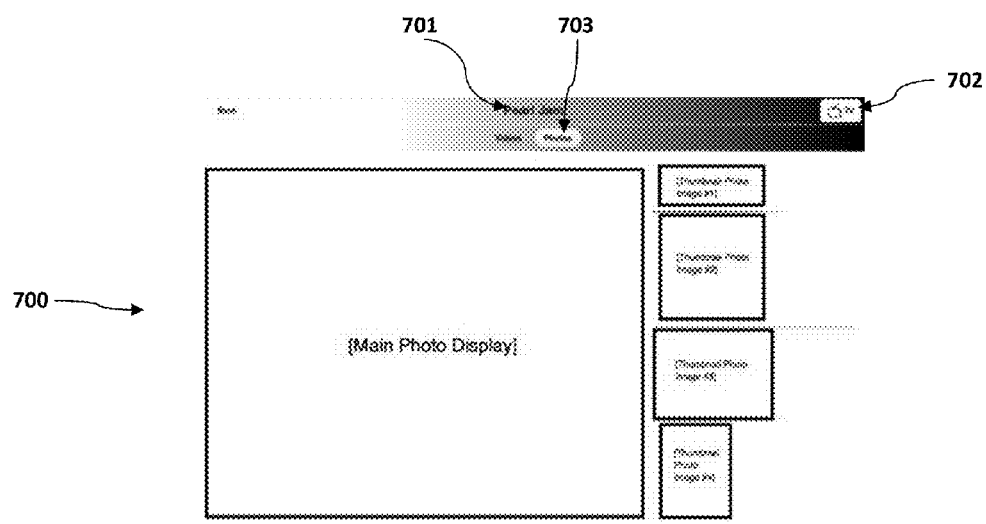
FIG. 6 illustrates an artist web photo gallery of an embodiment.

FIG. 6 illustrates an artist web photo gallery 700. Artist web photo gallery 700 includes artist selected 701, available device indicator 702, and media type selector 703.

The following is a description of one or more embodiments of the present invention, trademarked FREQSHO.

1. Overview:

FREQSHO is system and method of organizing, filtering, and displaying online content, that allows people to create their own "channels" for any band or artist, on any connected (Internet-enabled) device running the FREQSHO Client Application.

FREQSHO is preferably software and server-based. Specifically, once people use FREQSHO to search for their favorite artist, the System compiles applicable content related to that artist and available from a variety of sources (including those reachable via regular communications channels, such as the Internet) into one centralized and convenient location with an easy-to-navigate interface within the FREQSHO Client Application. The content includes, but is not limited to, web video content from online distribution sites (such as, but not limited to YouTube, Vimeo, and Viddler), web images from online photo sites (such as, but not limited to Picasa and Flickr), web information sites and databases (such as, but not limited to Wikipedia, Last.fm, Rovi Music Database, and EchoNest), and social media sites (such as, but not limited to Twitter and Facebook). FREQSHO also provides artists with the opportunity to offer exclusive content (such as, but not limited to videos, music, concert tickets, and merchandise) directly to fans using the FREQSHO client application. Users can use FREQSHO to explore new music, keep track of their favorite artist videos, and share playlists with their friends. And because it is device-agnostic and designed to work across multiple platforms (such as but not limited to Android, iOS, GoogleTV and Samsung SmartTV) and material can be made available to any connected device (such as, but not limited to smart phones, tablet PCs, and SmartTVs) FREQSHO lets people enjoy their favorite artists anywhere they want at anytime they choose.

From the FREQSHO system perspective, the present invention encompasses an algorithmic search, where the search criteria are continuously updated so as to improve relevancy. The search seeks content from a variety of media and categorizes the available content in a user-friendly way. From the user's perspective, once the user enter data, such as the name of a rock band, in a custom search bar, a series of channels is populated for that particular user, where the channels include the most relevant information for that rock band. The user can "click" on any of the items in the series of channels, and FREQSHO then obtains and delivers to the user, the content identified in the channel entry. The series of channels remains available to the user, no matter if the user moves to an alternate device or platform, and the series of channels is updated for relevancy.

2. Architecture:

The system of FREQSHO is a device-agnostic and platform-agnostic system. And, in order to allow users to create "channels" for their favorite artists on any type of device (like mobile phones, tablets, and SmartTVs) and on multiple platform systems for each type of device (like iOS and Android or mobile phones and tablets, or like Samsung, Phillips, Sony/GoogleTV for connected home theater systems), in the preferred embodiment FREQSHO employs two different but intricately-connected components: 1.) The FREQSHO Server-Based Software System, which organizes content from various sources and transmits it to the users via their chosen devices, and 2.) The FREQSHO Client Application which appears on the various devices the user may choose in order to engage with other FREQSHO system components.

The FREQSHO Server-Based Software System (the "FREQSHO System") employs an algorithm that FREQSHO uses to translate a user's search for a particular artist into a relevant compilation of online content related to that particular artist. Whether FREQSHO is searching online video distribution sites (such as, but not limited to YouTube, Vimeo, and Viddler), online photo sites (such as, but not limited to Picasa and Flickr), web information sites and databases (such as, but not limited to Wikipedia, Last.fm, Rovi Music Database, and EchoNest), or social media sites (such as, but not limited to Twitter and Facebook), the algorithm uses meaningful keywords/search-terms to identify the most useful online sources containing the most relevant and compelling content related to that user's artist search. FREQSHO is constantly improving the parameters of this algorithm with certain criteria related to the type of search being performed, so as to ensure the greatest probability of relevant results. The FREQSHO System then organizes the identified content into menus of relevant material, from which the user can select the individual items with which they wish to engage. These menus of relevant content organized by the FREQSHO system are then made available and delivered, via the Internet, to any devices running the FREQSHO Client Application.

The FREQSHO Client Application (the "FREQSHO Application") is a program that resides on the various connected devices through which users can access the Internet and use the FREQSHO System. The program allows each particular device to interpret the data being organized and transmitted by the FREQSHO System and display it in a visually compelling and accessible way for the user. Because each device is calibrated to receive information differently, the FREQSHO Application is built slightly differently for each device platform, but the end result is a consistent FREQSHO experience for each user, regardless of what device they are using. This consistent experience offers an array of Features and Functionality, including Multi-Artist "Intuitive" Search, Web-Video Player, Artist Info/Band Bios, Artist Social Media Site Integration, Artist Web-Photo Gallery, Exclusives, User Social Media Integration, User Favorite Lists, User Video Playlist Sharing, and Complete Integration Across Smart Devices.

The Architecture described above is outlined in FIG. 1.

3. Features and Functionality:

A.) Multi-Artist "Intuitive" Search Feature Description: FREQSHO includes an interactive tool bar (aka "search field") which may be used to facilitate searches. FREQSHO allows people to key in (by, for example, typing or voice) any band/artist name into the search field, and the system will rapidly generate a list of possible matches from which the user can select their desired artist. To make the user experience more friendly and less encumbered by typing out the full names of artists/bands, FREQSHO intuitively searches for possible matches based on each letter entered. The system continually updates and narrows down the list of possible matches with each letter entered, allowing the user to find their band/artist in the shortest amount of time.

Mechanism of Functionality: Once the user starts typing in the search field of the FREQSHO client application on a connected device, the application sends the partial search query to FREQSHO's servers, which in return triggers a search for the given query via Application Protocol Interfaces (APIs) with database sites such as Last.fm and EchoNest. The data results of this search (the names and pictures of the artists matching the search query) are forwarded back to the FREQSHO Application, which then displays all the artists matching the search query in a list from which the user can make their selection. If the user goes on typing onto the search field, the search process is triggered once again, further filtering and narrowing-down the results.

The Multi-Artist "Intuitive" Search described above is shown in FIG. 2.

B.) Web-Video Player

Feature Description: Once the artist is selected from the list of search results and the user selects the "Videos" section of the newly-generated "channel," FREQSHO populates a list of web-videos pulled down from popular, reliable online video distribution systems (such as, but not limited to YouTube, Vimeo, and Viddler).

Selecting a particular video allows the user to play this video and view it within the FREQSHO Application. Users may also perform a search for a specific video by entering keywords for a particular title into a search field, and letting FREQSHO perform a search of the same reliable online distribution systems for the video being queried. A list of potential matches will then be listed for the user to chose from, and selecting the video from this list will similarly result in the video being played in the FREQSHO Application.

Mechanism of Functionality: Once an artist has been selected and the user enters the "Videos" section, the FREQSHO Application asks the FREQSHO System servers for a list of video sources containing video clips of the artist's songs. In order to provide on topic videos which display recordings of live performances of the artist, video clips of his/her songs or any other videos which are most-relevant to the artist, the FREQSHO servers filter the videos retrieved from reliable online sources (such as, but not limited to YouTube, Vimeo, Viddler). There is also a server-side filtering of videos that distinguishes videos which cannot be reproduced on the actual device being used (be it because of technical or legal issues) and videos which are accessible from the device being used. The search engine identifies which videos are accessible from the device the user is currently using, and also identifies videos which cannot be played on the current device but indicates which other devices the videos are available on, for the user's future reference. The FREQSHO Application then creates a list of these accessible videos from which the user can make their selection. When the user makes their selection, the FREQSHO client application delivers the video by embedding the video player and its selected content from the original provider (be it YouTube, Vimeo, or any other), or a custom player, on the display.

The Web-Video Player described above is shown in FIG. 3.

C.) Artist Info/Band Bios

Feature Description: When the user selects the "Info" section of the app, the user is provided with biographical information on the selected artist/band. FREQSHO obtains this informational content by retrieving it from determined relevant online sources (such as, but not limited to Wikipedia, Last.fm, Rovi Music Database, EchoNest).

Mechanism of Functionality: Once the user has selected an artist and enters the "Info" section on the FREQSHO Application, biographical information is downloaded from the FREQSHO System servers regarding that artist. This information is in turn retrieved from several data sources, including but not limited to Wikipedia, Last.fm, Rovi Music Database and the EchoNest. It is displayed as hypertext so the user can navigate through other pages with information relevant to the band.

The Artist Info page described above is shown in FIG. 4.

D.) Artist Social Media Site Integration

Feature Description: By selecting options like "Twitter" or "Facebook" from the "Social" section of the app, users are able to view the latest news and content from the official online social media channels created by their selected band or artist. FREQSHO enables this by interfacing with the APIs provided by the various online social media outlets and integrating the content they provide into the FREQSHO client application.

Mechanism of Functionality: The FREQSHO System servers search social networks (such as, but not limited to Facebook, Twitter) for official and related feeds for the selected artists. This content is downloaded by the FREQSHO Application and displayed in the "Social" section.

The Artist Social Media Pages described above is shown in FIG. 5.

E.) Artist Web-Photo Gallery

Feature Description: The "Photos" section of the app allows users to view online images related to their selected band/artist. FREQSHO accomplishes this by searching the Internet and pulling down images from relevant, reliable online image depositories (such as, but not limited to Flickr, Picasa, and Bing Image Search).

Mechanism of Functionality: The FREQSHO System servers provide image feeds to the FREQSHO Application, aggregating images found using APIs including, but not limited to Flickr, Picasa, and Bing Image Search. These services are queried from the FREQSHO System servers with keywords relevant to the artist previously selected on the FREQSHO Application, and the image services assure the (pre-vetted) content is appropriate for public of all ages.

The Artist Web Photo Gallery described above is shown in FIG. 6.

F.) Exclusives Section

Feature Description: The Exclusives Section of the system is where users gain access to exclusive content, information, concert tickets and merchandise. The content (such as exclusive music tracks, videos, and access to live streaming performances) is approved and provided in advance by the artists, and either be stored on FREQSHO servers or pulled down from official artist sites or authorized third-parties. In one embodiment, the material in this section would be available exclusively through a service associated with the FREQSHO System and/or a subscription to the FREQSHO System.

Mechanism of Functionality: Upon selection of an artist on the client application, Exclusive content is retrieved by the FREQSHO System servers from reliable sources of video, audio and streaming multimedia content (such as, but not limited to UStream, Livestream, Amazon.com, and artist-preferred marketplaces). Some of the content may be purchased or otherwise obtained through online transaction mechanisms, and downloaded for future use onto the user's device. This content can be provided with or without Digital Rights Management (DRM) encoding to protect the distribution of the content.

G.) User Social Media Integration

Feature Description: FREQSHO will enable people utilize their favorite social media platforms (like Facebook and Twitter) to communicate with friends about their opinions, activities and discoveries within the app. The program will achieve this by integrating the APIs from the various social media outlets, allowing users to log into their accounts via FREQSHO, and utilize these social channels as they normally would.

Mechanism of Functionality: In the FREQSHO Application, the user can login with their Facebook or Twitter account (among others) in order to share and like content found in the application. The actions that can be performed are indigenous to the feature-sets of the different social networks being accessed by the FREQSHO Application over time. That is, on Twitter you can tweet about videos, artists, etc.; on Facebook you can "like" or share content on your Wall, etc.

H.) User Favorites Lists

Feature Description: FREQSHO will allow users to keep track of their most-liked videos by "tagging" them and compiling them into favorites lists. They can then access these videos directly by importing their favorites lists into future sessions with the app.

FREQSHO will achieve this by creating a backend database of users, letting each user set up a secure account, then access that secure account by logging into the app each time they use it.

Mechanism of Functionality: The FREQSHO System servers will store users' information in the form of user profiles. Each time a logged in user marks a video or song as favorite in the client application, it will be stored in the FREQSHO System servers' database in the user's profile for later retrieval by and reproduction in the FREQSHO Application being used. The login will be implemented according to well known web standards.

I.) User Video Playlist Sharing

Feature Description: People can use FREQSHO to share their favorite music videos with friends or explore what videos their friends are watching, by sharing their compiled playlists. This will be achieved either by letting users share access to certain information contained in their personal FREQSHO database, or by allowing users to share information via the API integration of other preferred social networking sites (such as, but not limited to, Facebook Connect and Twitter).

Mechanism of Functionality:

FREQSHO users can mark playlists of their content compilations as public (i.e. "shareable") in the FREQSHO Application. This allows the FREQSHO servers to provide those playlists to other users using the FREQSHO Application, whenever they search for them through the FREQSHO System. Users will differentiate their playlists by giving them titles, the names of which, in turn, can be used as search criteria for FREQSHO. The logging of playlist sharing will be part of the users' profiles. Additionally, users will be able to us the FREQSHO Application to share playlists on social networks (such as, but not limited to Facebook and Twitter) using the APIs of these social networks to feature these playlists on the users' personal feeds.

J.) Complete Integration Across Smart Devices

Feature Description: FREQSHO will work seamlessly across all connected devices (like mobile phones, computers, tablet PCs, and internet-connected home theater systems) and across multiple platforms (like iOS, Android, Samsung SmartTVs), so people can enjoy the app on-the-go and even transfer their viewing experience from one device to another (for instance, from their mobile phone to their SmartTV set or connected Blu-Ray player. Because the mobile version of the app can communicate with the SmartTV version of the app, FREQSHO can also enable a mobile devices to serve as a remote control for the app on connected television systems. FREQSHO achieves this by employing third-party programs (such as, but not limited to MOVL) to facilitate the integration between devices.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for a web server to form an interactive playlist comprising the steps of:
   receiving a query from a user-controlled device connected to said web server;
   determining the relevancy of said query by comparing the content of said query to a collection of known content elements for said query;
   using the internet, searching a plurality of online depositories for material responsive to said query, said material including content for display and a set of meta data associated with an online location of a media file associated with said content for display;
   retrieving said responsive material from at least one of said online depositories;
   arranging said responsive material into entries in a playlist, said playlist accessible by said user using an interactive device;
   identifying in at least one of said depositories the location of one or more alternate media files related to said content for display;
   identifying and capturing meta data associated with said alternate media file; and
   replacing at least one set of meta data in said playlist with a set of meta data associated with at least one of said alternate media files;
   wherein the media files associated with said entries in said playlist are selectable by a user by said user clicking on one of said entries.

2. The method of claim 1, wherein said content for display comprises artist biographical information.

3. The method of claim 1, wherein said content for display further includes relevant content available from social media channels.

4. The method of claim 1, wherein said media files and said alternate media files include video displayable as picture-in-picture.

5. The method of claim 1, wherein said relevancy of said query is improved based on media files determined by an artist associated with said content for display.

6. The method of claim 5, wherein said relevancy of said query is further improved based on user feedback.

7. The method of claim 1, wherein said content for display includes at least one of information regarding tours, news, and similar artists.

8. The method of claim 1, wherein said content for display includes at least one photograph.

9. The method of claim 1, wherein a media file associated with selected content is amended so as to conform to the device selected for playback.

10. The method of claim 1, wherein at least one of said depositories is only accessible by a user if said user is authenticated by said web server.

11. A system for arranging media files for playback selection comprising:
- a processor-based web server,
- a user-operated processor-based computing platform, and
- a playback device;
- wherein said web server receives a query associated with a user from a device in communication with said web server; determines the relevance of said query by comparing the content of said query to a collection of known content elements for said query; searches a plurality of depositories for material responsive to said query, said material including content for display and a set of meta data associated with an online location of a media file associated with said content for display; retrieves said responsive material from at least one of said online depositories; arranges said material into entries in a playlist, said playlist accessible by said user using a device; identifies third party preferences for one or more of said media files, said preferences determined based on video quality or artist preference; identifies in at least one of said depositories the location of one or more alternate media files related to said content for display; identifies and captures meta data associated with said alternate media file; and replaces at least one set of meta data in said playlist with a set of meta data associated with at least one of said alternate media files.

12. The system of claim 11, wherein said content for display comprises artist biographical information.

13. The system of claim 11, wherein said content for display further includes relevant content available from social media channels.

14. The system of claim 11, wherein said media files and said alternate media files include at least one of video and music.

15. The system of claim 11, wherein said relevancy of said query is improved based on media files determined by an artist associated with said content for display.

16. The system of claim 15, wherein said relevancy of said query is further improved based on user feedback.

17. The system of claim 11, wherein said content for display includes video.

18. The system of claim 11, wherein said content for display includes at least one photograph.

19. A method for a web server to create an interactive menu comprising the steps of:
- receiving a query associated with a user from a device connected to said web server,
- determining the relevance of said query by comparing the content of said query to a collection of known content elements for said query;
- using the internet, searching a plurality of depositories for material responsive to said query, said material including content for display and a set of meta data associated with an online location of a media file associated with said content for display;
- retrieving said responsive material from at least one of said online depositories;
- arranging said material into entries in a playlist, said playlist accessible by said user using a device;
- identifying third party preferences for one or more of said media files, said preferences determined based on an artist preference or video quality of said media files;
- identifying in at least one of said depositories the location of one or more alternate media files related to said content for display;
- identifying and capturing meta data associated with said alternate media file; and
- replacing at least one set of meta data in said playlist with a set of meta data associated with at least one of said alternate media files;
- wherein the media files associated with said entries in said playlist are selectable by a user by said user clicking on one of said entries.

20. The method of claim 19, wherein said media files and said alternate media files include information regarding channel/playlist social sharing and additionally identify the genre of said media in said media files and said alternate media files.

* * * * *